United States Patent

Zographos et al.

[11] 3,852,064
[45] Dec. 3, 1974

[54] USE OF DIOXAZINE PIGMENT IN THE PHOTOELECTROPHORETIC PRODUCTION OF IMAGES

[75] Inventors: Georgeos Zographos, Zurich; Andre Pugin, Riehen; Kurt Burdeska, Basel, Switzerland

[73] Assignee: Ciba-Geigy Corporation, Ardsley, N.Y.

[22] Filed: Dec. 26, 1972

[21] Appl. No.: 318,320

[30] Foreign Application Priority Data
Dec. 28, 1971 Switzerland.................... 19047/71

[52] U.S. Cl................. 96/1.3, 96/1 PE, 96/1.5, 204/181 PE
[51] Int. Cl...... G03g 13/00, G03g 5/00, G03g 7/00
[58] Field of Search.................. 96/1.3, 1.5, 1 PE; 204/181 PE

[56] References Cited
UNITED STATES PATENTS

| | | |
|---|---|---|
| 3,442,781 | 5/1969 | Weinberger .................. 96/1.2 |
| 3,474,020 | 10/1969 | Tulagin et al. ................ 96/1 PE |
| 3,635,981 | 1/1972 | Weinberger .................. 96/1 PE |
| 3,667,943 | 6/1972 | Weinberger .................. 96/1.5 |
| 3,667,944 | 6/1972 | Weinberger .................. 96/1.5 |
| 3,758,305 | 9/1973 | Weinberger .................. 96/1.5 |

Primary Examiner—David Klein
Assistant Examiner—Edward C. Kimlin

[57] ABSTRACT

Process for the photoelectrophoretic production of images, wherein a layer of a suspension is exposed to an electrical field between two electrodes of which at least one is transparent and the suspension is simultaneously exposed to an image with an actinic radiation through the transparent electrode, whereupon a pigment image which consists of particles which have migrated is produced on at least one of the electrodes, with the suspension containing a plurality of fine particles of at least one colour which contain a light-sensitive pigment, characterised in that the light-sensitive pigment used is a dioxazine

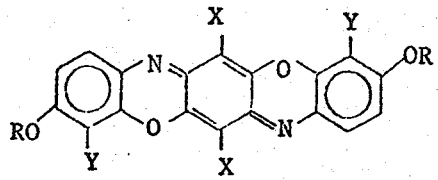

wherein R denotes an alkyl group with 1–4 C atoms or an optionally substituted phenyl group, X denotes a hydrogen, chlorine or bromine atom and Y denotes a chlorine or bromine atom.

4 Claims, 1 Drawing Figure

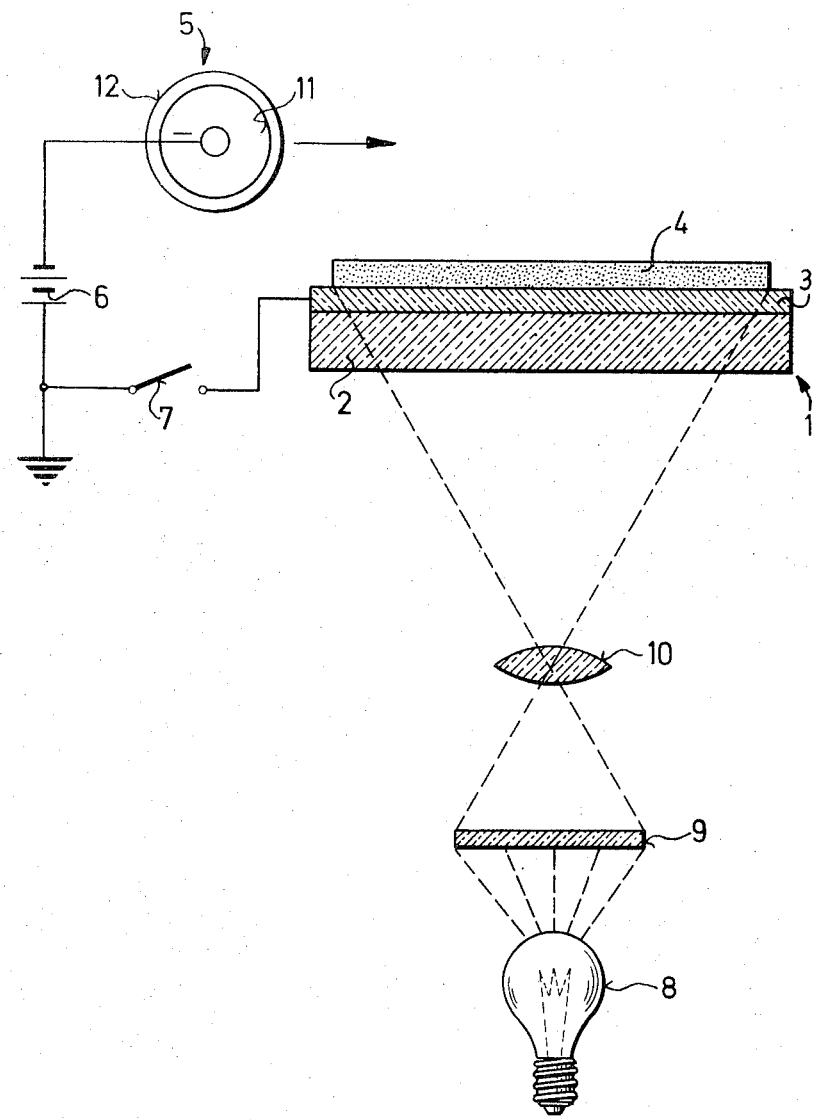

USE OF DIOXAZINE PIGMENT IN THE PHOTOELECTROPHORETIC PRODUCTION OF IMAGES

It is known that monochromatic and polychromatic reproductions can be produced electrophoretically by the use of photoconducting organic pigments. This system uses photoconducting particles and is described, for example, in U.S. Pat. No. 3,384,565, 3,384,566 and 3,385,480. In an image production system of this nature, light-absorbing particles of different colours are suspended in a non-conducting liquid carrier. The suspension is introduced between two electrodes of which at least one is transparent, exposed to an electronic field, and simultaneously exposed to an image by means of an actinic radiation through the transparent electrode, whereupon a pigment image which consists of particles which have migrated is produced on at least one of the electrodes, the suspension containing a plurality of fine particles of at least one colour containing a light-sensitive pigment.

An essential component of the system are the suspended particles which must be electrically photosensitive. These particles evidently undergo a change of charge on irradiation with an activating electromagnetic radiation, and in particular do so through interaction with one of the electrodes. In a monochromatic system, particles of a single colour are used whereupon a single colour image is produced, which is equivalent to a customary black and white image. In a polychromatic system, the images are produced in natural colour since mixtures of particles of two or more different colours, which are each sensitive towards light of a specific wavelength or a narrow wavelength range, are used.

Hitherto, only few pigments are known which meet the high requirements of electrophoretic reproduction technology. This is because the dyestuffs in question must be distinguished by the following properties: pure colour shade, high colour strength and fastness to light, insolubility in water and organic solvents, and great photosensitivity. Furthermore it is important that the maximum of the photosensitivity should, if possible, lie in the same wavelength range as the maximum of the light absorption. The dyestuffs must also be sufficiently transparent so that on superposing three toners an intense deep black results.

It has now been found that dioxazines of the formula

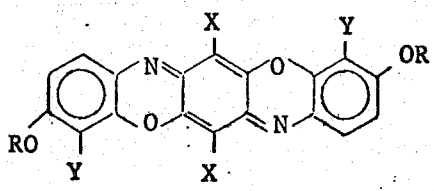

wherein R denotes an alkyl group with 1–4 C atoms or an optionally substituted phenyl group, X denotes a hydrogen, chlorine or bromine atom and Y denotes a chlorine or bromine atom are outstandingly suitable for the photoelectrophoretic production of images.

Particular interest attaches to the dioxazine of the formula

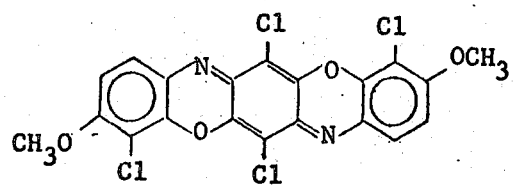

and to the dioxazines of the formula

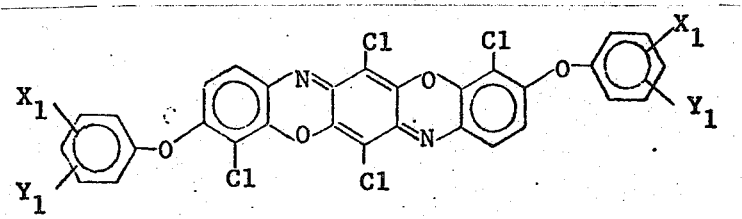

wherein $X_1$ and $Y_1$ denote halogen atoms, especially chlorine atoms or alkyl groups with 1 – 4 C atoms, especially methyl groups.

These dioxazines are known dyestuffs, the manufacture of which is described in German Pat. Specification No. 1,569,608.

The dyestuffs are preferably present in a finely divided form, with the average particle size being appropriately less than 10 $\mu$ and advantageously between 0.1 and 5 $\mu$. It is of advantage if the particles are of uniform size.

The toners appropriately contain a binder which permits the fixing of the pigment particles to the ultimate image carrier. The specific resistance of the binder should be greater than $10^{10}$ Ohm.cm, appropriately greater than $10^{12}$ Ohm.cm. Natural, semi-synthetic or synthetic resins are suitable for this purpose, such as abietic acid esters, tetrahydroabietic acid esters, cellulose esters, cellulose ethers, chlorinated rubber, vinyl resins, for example polyvinyl chloride, polyvinyl acetate, copolymers of vinyl chloride and vinyl acetate, polyvinyl acetates, polyvinyl alcohols, polyvinyl ethers, polyvinylcarbazole, polyisobutylene, polybutadiene, polyacrylic or polymethacrylic esters, polystyrene, polyacrylonitrile or silicone resins. As examples from the series of the condensation resins there may be mentioned: phenol-formaldehyde resins, urea-formaldehyde resins, melamine-formaldehyde resins, aldehyde or ketone resins, polyamides, polyurethanes or epoxy resins. The proportion of binder in the toner is appropriately between 10 and 60%. It proves advantageous, for example when grinding or kneading the toner with the binder, to achieve as intimate mixing of the two as possible. Whilst doing so, the desired reduction of the particle size can be achieved simultaneously if a crude pigment is used.

The use of the dyestuffs according to the invention in photoelectrophoretic image production systems is explained in more detail in the comments which follow, with reference to the attached drawing which shows an example of such a system.

The drawing shows a transparent electrode 1 which in this case consists of a layer of an optically transparent glass 2 which is coated with a thin optically transparent layer 3 of tin oxide. This material is commercially available under the description "NESA Glass."

This electrode is hereafter described as the "injector electrode." A thin layer 4 of finely divided light-sensitive particles dispersed in an insulating liquid carrier, is coated onto the surface of the injector electrode 1. The term "light-sensitive" is intended to convey, according to the invention, the property of a particle that, after it has once been attracted by the injector electrode, it migrates away from the electrode under the influence of an applied electrical field if an irradiation with an actinic electromagnetic radiation takes place. A more detailed theoretical discussion of the mechanism which probably takes place is to be found in U.S. Pat. Nos. 3,384,565 3,384,566 and 3,385,488. The liquid suspension 4 can furthermore contain a sensitiser and/or a binder for the pigment particles, these agents being at least partially soluble in the suspending liquid or carrier liquid, as will still be explained in more detail below. Adjoining the liquid suspension there is a second electrode 5, which is hereafter described as the "blocking electrode." This electrode is connected to one side of the source of potential 6 by a switch 7. The opposite side of the source of potential 6 is connected to the injector electrode 1 so that, if the switch 7 is closed, an electrical field is applied at right angles to the liquid suspension 4 between the electrodes 1 and 5. An image projector consisting of a light source 8, a diapositive 9 and a lens 10 irradiates the dispersion 4 with a light image of the diapositive 9 which is to be reproduced. The electrode 5 is constructed in the form of a roller with a conducting central core 11 connected to the source of potential 6. The core is covered with a layer of a blocking electrode material 12, which can be baryte paper. The pigment suspension is irradiated with the image to be reproduced, whilst applying a potential at right angles to the blocking electrode and injector electrode by closing the switch 7. With the switch 7 closed, the roller 5 is rolled over the upper surface of the injector electrode 1 during the image-wise irradiation. The irradiation with light has the consequence that exposed pigment particles which were originally attracted by the electrode 1, migrate through the liquid and adhere to the surface of the blocking electrode, leaving on the injector electrode surface a pigment image which is a duplicate of the diapositive 9. After the irradiation, the relatively volatile carrier liquid is evaporated, whereupon the pigment image is left. This pigment image can subsequently be fixed in situ, for example by application of a coating layer to the upper surface or by means of a binder dissolved in the carrier liquid, such as, for example, paraffin wax. It is also possible to use some other suitable binder which comes out of solution when the carrier liquid evaporates. About 3 – 6 per cent by weight of the paraffin binder in the carrier give good results. The carrier liquid itself can be a liquid paraffin wax or some other suitable binder. According to another embodiment, the pigment image which remains on the injector electrode can be transferred to another surface and fixed thereon. As will still be explained in more detail below, this system can produce either monochromatic or polychromatic images, depending on the type and on the number of the pigments which are suspended in the carrier liquid and depending on the colour of the light with which this suspension is irradiated whilst carrying out the process. Any suitable insulating liquid can be used as the carrier for the pigment particles in the system. Typical carrier liquids are decane, dodecane, n-tetradecane, paraffin, beeswax or other thermoplastic materials, Sohio Odorless Solvent 3,440 (a kerosene fraction which is marketed by Standard Oil Company, Ohio) and Isopar-E (a branched-chain saturated aliphatic hydrocarbon which is marketed by Esso Oil Company, N.J.). Images of good quality are achieved at voltages of between 300 and 5,000 volt which are applied using the device described in the attached drawing. The proportion of pigment in the solvent is appropriately 2 – 10%. The addition of minor amounts, for example 0.5 – 5 mol%, of electron donors or acceptors to the suspensions results in a noticeable improvement of the light sensitivity of the system.

In a monochromatic system, particles of the same composition are dispersed in the carrier liquid and irradiated with a black and white image. Hereupon, a single colour is obtained, analogously to a customary black and white image. In a polychromatic system, the particles are so chosen that the particles of various colours respond to the different wavelengths in the visible spectrum in accordance with their main absorption bands. Furthermore, the pigments should be so chosen that their spectral response curves do not significantly overlap so that a colour separation and a substractive polychromatic image production is possible. In a typical polychromatic system, the dispersion of the particles should contain cyan-coloured particles which are mainly sensitive towards red light, magenta-coloured particles which are mainly sensitive to green light, and yellow-coloured particles, which are mainly sensitive to blue light. On mixing in a carrier liquid, these particles produce a liquid of black appearance. If one or more of these particles migrates from the electrode 11 in the direction of the upper electrode, particles are left which produce a colour equivalent to the colour of the incident light. For example, the consequence of an irradiation with red light is that the cyan-coloured pigments migrate, with the magenta-coloured and yellow-coloured pigments being left. The combination of these colours gives a red final image. In the same manner, blue and green colours are reproduced by removal of the yellow or magenta-coloured pigments. If white light is incident on the mixture, all pigments migrate so that the transparent substrate is left. If no irradiation takes place, all pigments are left and together give a black colour. This is an ideal method of a substractive colour production since the particles in each case do not consist merely of a single component but additionally fulfil the double function of an image dyestuff and of a light-sensitive medium.

The dyestuffs according to the invention are outstandingly suitable for use in an electrophoretic monochromatic or polychromatic image production system. Their good spectral response capacity and their high light sensitivity result in the formation of dense and brilliant images.

The examples which follow explain the invention. The parts and percentages mentioned are by weight, unless otherwise stated. These examples explain various embodiments of the electrophoretic image production process without however restricting the invention thereto.

The examples which follow are carried out in an apparatus which corresponds to the type explained by the attached drawing. The image production mixture 4 is applied to a NESA glass substrate. Irradiation takes place through this glass. The NESA glass surface is connected in series to a switch, a source of potential and the conducting core of a roller which possesses a baryte paper coating on its surface. The roller has a diameter of about 63 mm (2½ inches) and is moved over the surface of the plate at a speed of about 1.45 cm per second. The plate used has a size of about 19.3 cm² (3 square inches) and is irradiated with a light intensity of 8,000 foot candles, measured on the uncoated NESA glass surface. The potential applied is 2,500 volt. Irradiation takes place with a 3,200 K lamp through a neutral dense wedge filter for measuring the sensitivity of the suspensions towards white light and through Wratten filters 29, 61 and 47b, which are each individually brought in front of the light source in order to measure, in separate tests, the sensitivity of the suspensions towards red, green and blue light.

Example 23 of U.S. Pat. No. 3,442,781 describes the use of 2,9-dimethoxy-6,13-dichlorotriphenedioxazine for photoelectric reproduction processes. However, this dyestuff is unsuitable for trichromic processes because of its dull grey colour shade. The dioxazines to be used according to the invention are furthermore distinguished by substantially better photoconductivity, as compared to this pigment.

EXAMPLE 1

10 g of the dioxazine of the formula

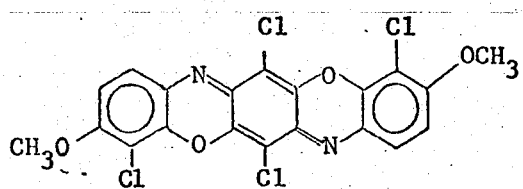

having an average particle size of at most 1 μ are suspended in 90 g of Isopar E, a saturated aliphatic hydrocarbon, obtainable from ESSO Standard. The resulting paste is employed, as it is or diluted with further Isopar E for the process described above. Brilliant magenta images of outstanding transparency and fastness to light are obtained.

EXAMPLES 2 – 5

Similar images are obtained if the procedure of Example 1 is followed but the following dioxazines are used:

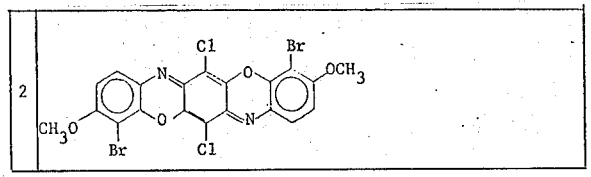

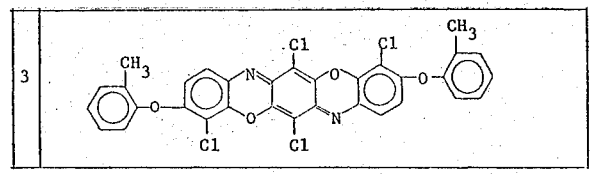

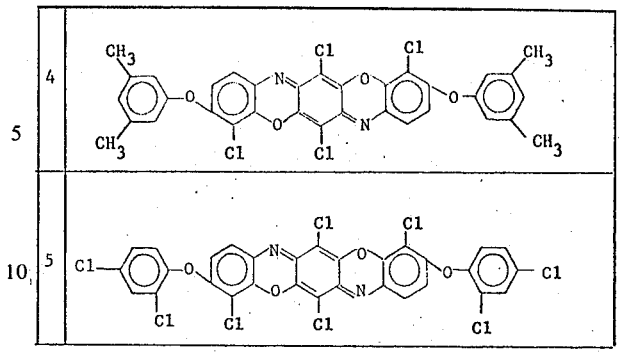

What we claim is:

1. Process for the photoelectrophoretic production of images, wherein a layer of a suspension is exposed to an electrical field between two electrodes of which at least one is transparent and the suspension is simultaneously exposed to an image with an actinic radiation through the transparent electrode, whereupon a pigment image which consists of particles which have migrated is produced on at least one of the electrodes, with the suspension containing a plurality of fine particles of at least one colour which contain a light-sensitive pigment, characterised in that the light-sensitive pigment used is a dioxazine

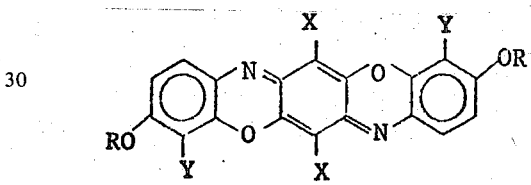

wherein R denotes an alkyl group with 1–4 C atoms or an optionally substituted phenyl group, X denotes a hydrogen, chlorine or bromine atom and Y denotes a chlorine or bromine atom.

2. Process according to claim 1, characterised in that a dioxazine of the formula

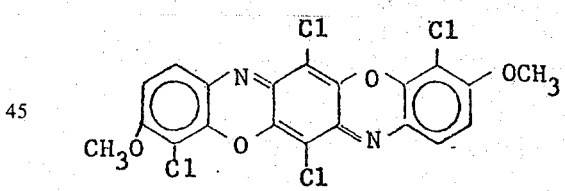

is used.

3. Process according to claim 1, characterised in that a dioxazine of the formula

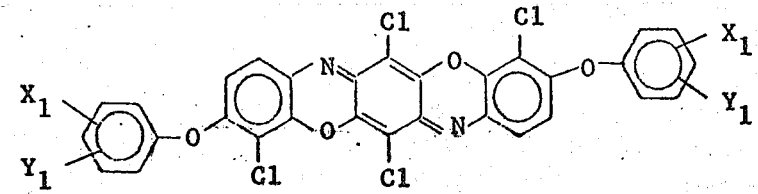

wherein $X_1$ and $Y_1$ denote halogen atoms, especially chlorine atoms, or alkyl groups with 1 – 4 C atoms, especially methyl groups, is used.

4. Process according to claim 1, characterised in that the pigments have a particle size of 0.1 – 5 μ.

* * * * *